United States Patent [19]
Yamaguchi

[11] Patent Number: 6,110,229
[45] Date of Patent: Aug. 29, 2000

[54] USER ENVIRONMENT TRANSFER SYSTEM OF INFORMATION APPARATUS

[75] Inventor: Jinsei Yamaguchi, Hiratsuka, Japan

[73] Assignee: International Intelligent Information Co., Ltd., Kouchi, Japan

[21] Appl. No.: 09/026,911

[22] Filed: Feb. 20, 1998

[30] Foreign Application Priority Data

Feb. 21, 1997  [JP]  Japan .................................. P9-078823

[51] Int. Cl.$^7$ .................................................. G06F 13/00
[52] U.S. Cl. .................................................................. 717/11
[58] Field of Search ................................ 395/712; 717/11

[56] References Cited

U.S. PATENT DOCUMENTS

| | | | |
|---|---|---|---|
| 5,206,951 | 4/1993 | Khoyi et al. ............................ | 709/303 |
| 5,329,619 | 7/1994 | Page et al. ............................. | 709/203 |
| 5,369,749 | 11/1994 | Baker et al. ............................ | 709/104 |
| 5,801,942 | 9/1998 | Nixon et al. ............................ | 364/188 |
| 5,850,545 | 4/2000 | Matsushita ............................. | 709/302 |
| 5,900,870 | 5/1999 | Malone et al. .......................... | 345/333 |
| 5,909,545 | 6/1999 | Frese II, et al. ....................... | 709/208 |
| 5,931,900 | 8/1999 | Notani et al. ........................... | 709/201 |
| 6,038,587 | 3/2000 | Phillips et al. .......................... | 709/101 |
| 6,047,288 | 4/2000 | Kurosawa et al. ........................ | 707/9 |

OTHER PUBLICATIONS

Szczur et al., Tae Plus: Transportable Applications Enviroment Plus: A User Interface Development Enviroment, ACM, p. 76–101, Jan. 1993.

Thomas et al., An Adaptive Environment for User Interface of Excel, ACM, p. 123–130, 1992.

Doleh et al., SUI: A System Independent User Interface for an Integrated Scientific Computing Environment, ACM, p. 88–95, 1990.

*Primary Examiner*—Tariq R. Hafiz
*Assistant Examiner*—John Q. Chavis
*Attorney, Agent, or Firm*—Oblon, Spivak, McClelland, Maier & Neustadt, P.C.

[57] ABSTRACT

An operating system (OS) of an information device determines attribute values of one or more environment elements in accordance with user information input through a user interface, creates a hierarchical user environment information field component-wisely corresponding to a set of hierarchical environment elements, and transfers an entirety or a part of the user environment information field, as it is selected, to another information device, where another OS automatically updates a user environment in accordance with the transferred information.

12 Claims, 7 Drawing Sheets

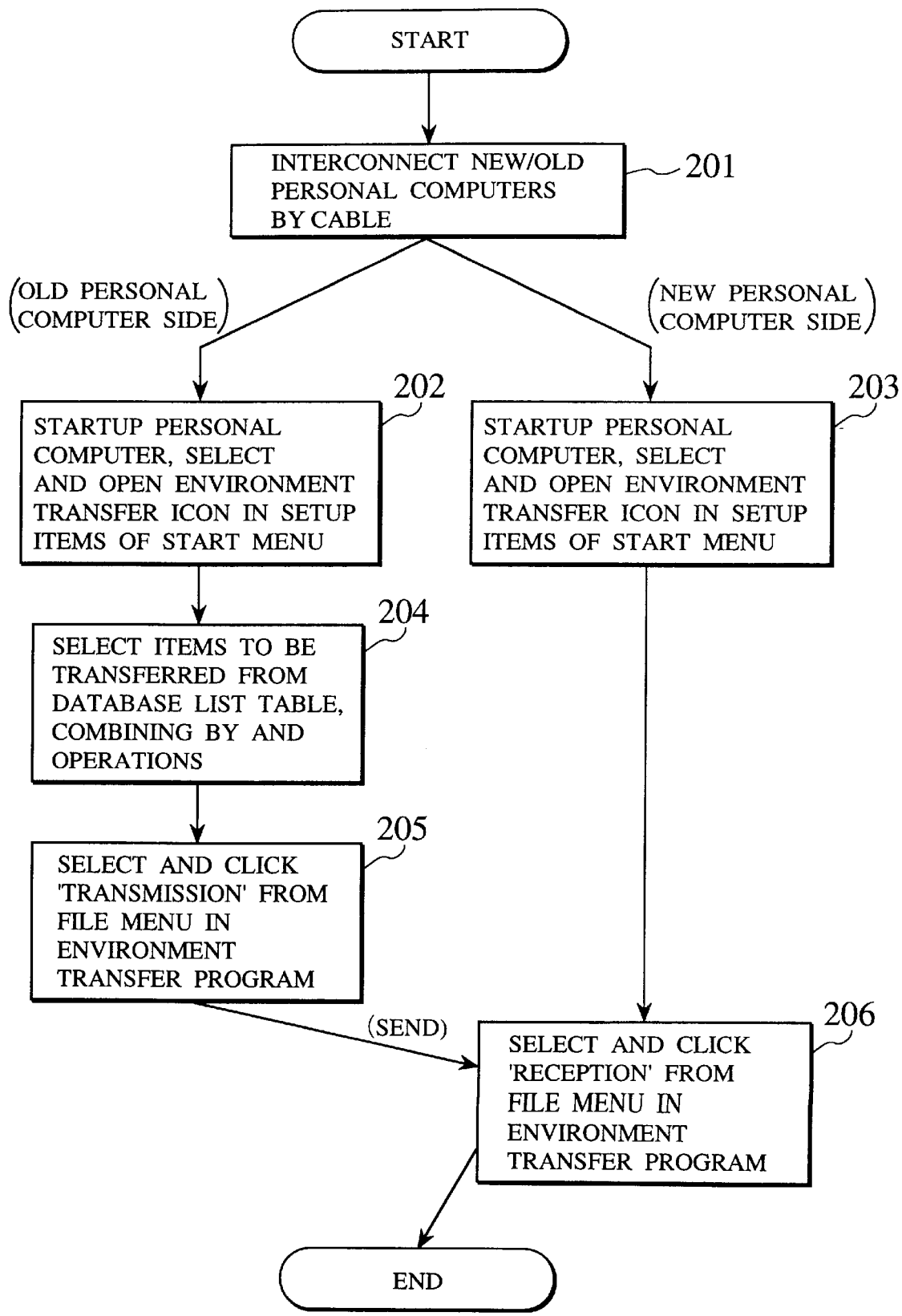

USER ENVIRONMENT TRANSFER SYSTEM OF INFORMATION APPARATUS

BACKGROUND OF THE INVENTION

1. Field of the Invention

The present invention generally relates to an environment transfer system of an information apparatus. More particularly, it relates to an environment transfer system of an information apparatus including an information processing unit which incorporates an OS (Operating System), such as a personal computer, an information home electronics like an intelligent telephone, or a PDA (personal digital assistant). The environment transfer system permits a respective personal user to transfer a user environment from one information apparatus to another information apparatus, by himself or herself, without requiring an assistance of others, such as an administrator of a network system, when such an information apparatus is to be exchanged, or when otherwise necessary.

2. Description of Relevant Art

Such an information apparatus includes a user environment of the OS level which each user can set up or change.

The user environment comprises a group of hierarchical environment elements which can be set up individually. Upper-level environment elements are set up by setting lower-level environment elements, and the lower-level environment elements are set up by defining attribute values of various setup items therein.

For instance, in the case of a personal computer in which an OS of a Windows type is installed, there are: upper environment elements such as a "control panel" and a "printer" to be indicated in a sub-menu when a "set up" in a "start" menu of the OS is selected; medium environment elements such as a "screen", an "internet" and a "mail and fax" to be indicated with appropriate icons when the "control panel" is opened among the upper environment elements; and lower environment elements such as a "background", a "screen saver" and a "design" to be indicated in an indexed manner when an icon of the "screen" is selected among the medium environment elements.

Further, if e.g. an index of the "background" is clicked, setup items such as a "pattern" and a "wallpaper" are indicated, or if an index of the "screen saver" is clicked, setup items named "screen saver" and "display power saving functions" are indicated.

These setup items have their hierarchical attributes, and most of the attributes have their attribute values preset so as to be changeable at the user end. Each user may accept all of those preset default values, or change some of them to other selective attribute values. If no default values are given, the user may write real numeric values and/or characters.

The setting of setup items is thus completed, whereby lower environment elements are set up, as well as medium and upper environment elements to be likewise set up, relative to associated attributes.

Among such environment elements of the hierarchical user environment, each environment element comprises a set of attributes involved in lower environment elements or setup items, and concurrently serve as a setup item for upper environment elements. This means each attribute also is an environment element of the user environment.

In this sense, the user environment of an OS comprises a plurality of hierarchical environment elements which can be set by a user, and these environment elements are frequently renewed or updated in a voluntary manner in accordance with the know-how and preferences of the user.

Thus, the user environment is a kind of co-work by the OS and a user, and constitutes an important information asset for the user.

The information asset is conceptually different from a mere file consisting of OS programs or application programs, or user input data edited on those programs. It has been impossible for the conventional OS to collectively transfer such information assets.

However, the information apparatus and the OS are very frequently renewed into new versions, and users exchange the information apparatus, as necessary.

In such occasions of exchanging the information apparatus, an OS of a new version normally includes environment elements which correspond to the OS of the old version.

Thus, conventionally, users used to record detailed setup information for each of concerned environment elements in the information apparatus, and in accordance with the records, the users used to set corresponding environment elements in the new information apparatus all over again.

Consequently, when a user desires to buy a new information apparatus or an OS of a higher version, he or she is troubled, taking a long time for maintaining the information assets.

This kind of problems have been caused in the fact that the design of the conventional OS's has failed to provide conveniences with a view to an open management of the user environment to users. In this case, it is extremely difficult for any user to deal with this problem by making a program externally connectable to an OS of an information apparatus, because not only technical difficulties but also an issue of a copyright is involved.

SUMMARY OF THE INVENTION

The present invention has been achieved with such objects in view, and it therefore is an aim of the invention:

1) to provide a user environment transfer system of an information apparatus in which, when each of respective personal users desires to change or extend an information apparatus, a user environment can be transferred relatively easily, and the information assets can easily be maintained; and 2) to achieve the aim by improving an OS itself installed in the information apparatus.

To achieve the above aim, an aspect of the invention provides a user environment transfer system of an information apparatus which is equipped with at least both a user interface capable of inputting user information and an OS provided with a user environment comprising a set of hierarchical environment elements. When the OS determines attribute values of one or more environment elements in accordance with the user information input through the user interface, then the system:

1) creates a hierarchical user environment information field which component-wisely corresponds to a set of environment elements;

2) selects a part of the user environment information field; and 3) transfers the part to another information apparatus.

A range to be defined as a user environment is uniquely determined depending on a kind of the OS. For example, in the case of an OS of a Windows X type, the range may include all of icon-indicated environment elements in a "control panel" in items of a "setup", all of environment elements in a "printer", a list of internet home pages registered at a book mark in an internet program, information associated with a dictionary such as registered words for translation of various languages including the English, and the like.

The user environment information field is equivalent to a set of environment elements scattered in the OS, after a setting of the user environment by a user. The difference is that the information field collects a set of environment elements as a unified concept. This is a notion that has never been present. In other words, the user environment information field has a range as well as a hierarchical structure (as a plurality of trees) defined by the user environment of the OS. On the other hand, it has contents defined by the user.

The reason why I distinguish the user environment information field as a different unified object from the set of inherent attribute-valued user environments itself, is to permit the following:

1) The system can display an entirety of the user environment information field on a display.
2) The user can designate the entirety or a part of it voluntarily and easily.
3) The system can transfer the designated part between OS's.

The present invention is for transferring this user environment information field to another information apparatus such as a renewal information apparatus. If the another information apparatus incorporates an OS which is the same as or newer than the above-described OS, with respect to common environment elements, the transferred user environment information field can be utilized as user environment renewal information, by over-writing or inserting or the like.

More specifically, in a future new OS according to the invention, there will be independently incorporated a user environment information field as a "copied structural body" of a range of (attribute-valued) user environment. In other words, the new OS is produced in this manner. As a result, the user environment information field can be processed by the new OS as an independent information field, and can be transferred independently.

Therefore, according to the present invention, when an information apparatus is to be changed or expanded, each of respective personal users can transfer the user environment relatively easily, and can maintain the information assets. Further, these objects can be achieved by an improvement of an OS itself incorporated in an information apparatus.

BRIEF DESCRIPTION OF THE ACCOMPANYING DRAWINGS

A more complete appreciation of the invention and many of the attendant advantages thereof will be readily obtained as the same becomes better understood by reference to the following detailed description when considered in connection with the accompanying drawings wherein:

FIG. 7 is a flowchart showing operations for the environment transfer which is performed in FIG. 1.

DETAILED DESCRIPTION OF PREFERRED EMBODIMENTS

Figure 1:
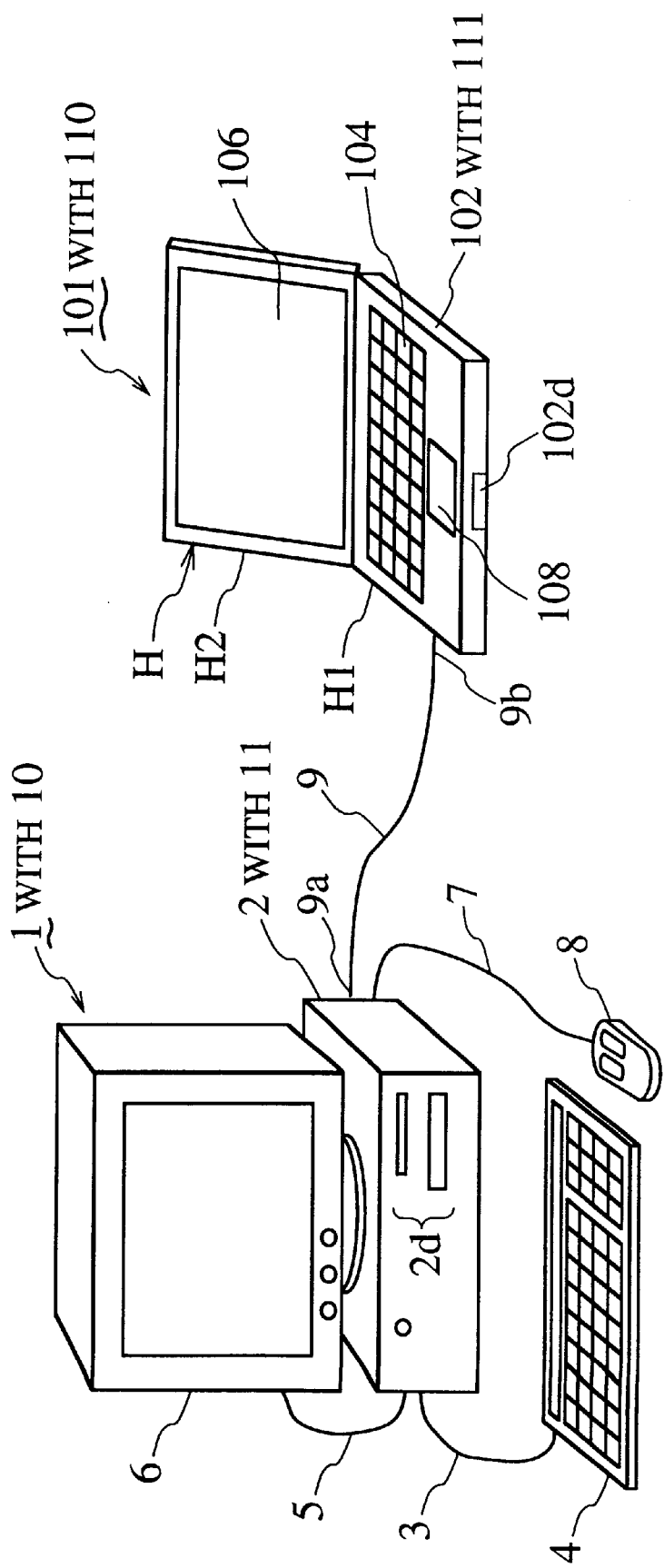
FIG. 1 is an illustration showing a state in which a user environment is transferred from a current information apparatus including a user environment transfer system of a current version according to a first embodiment of the present invention to a new information apparatus including a user environment transfer system of a subsequent version according to another embodiment.

Referring now to the drawings, wherein like reference numerals designate identical or corresponding parts throughout the several views, and more particularly to FIGS. 1–7 thereof, there are illustrated various embodiments of the present invention, as are further discussed.

Figure 2:
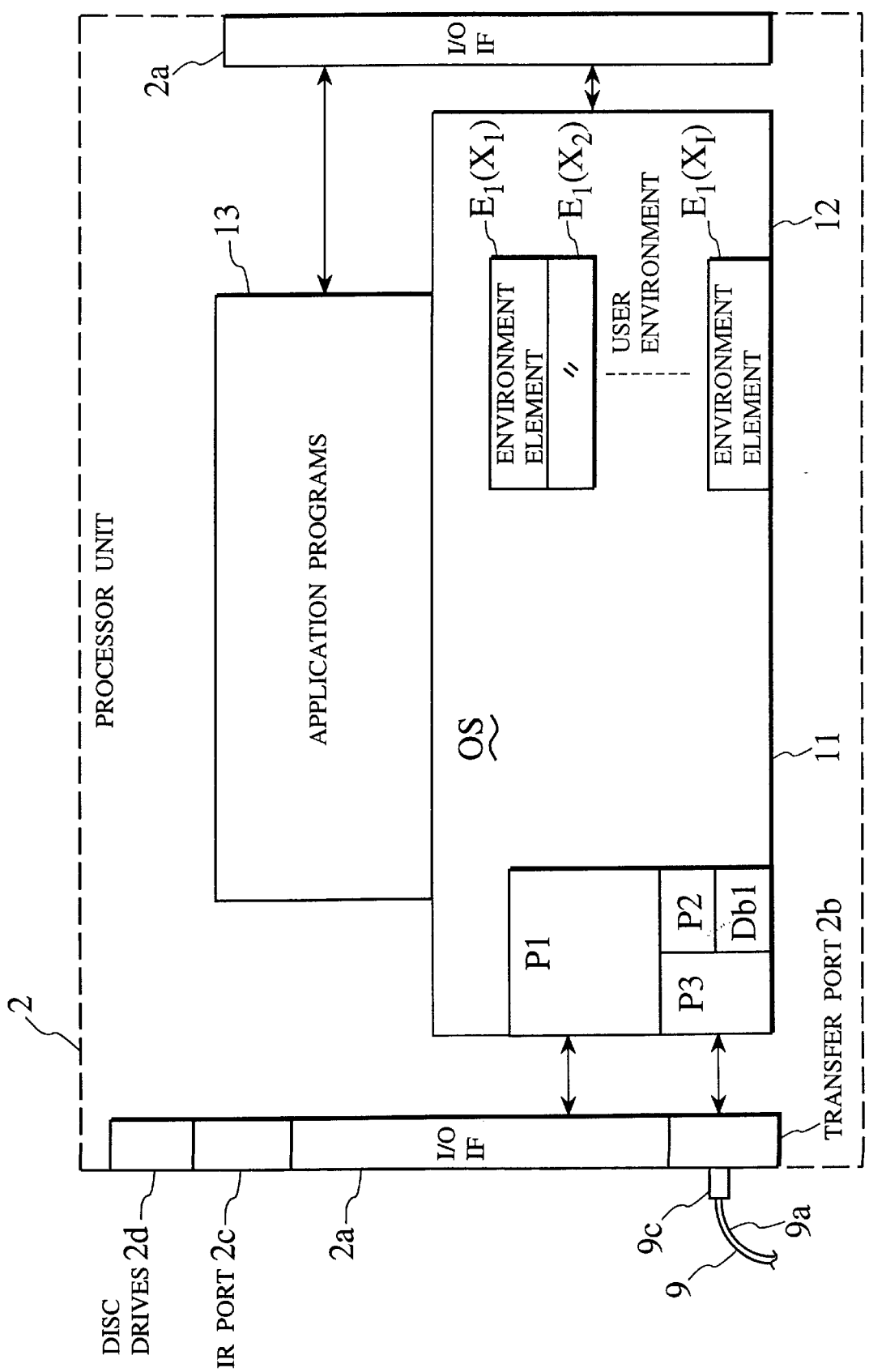
FIG. 2 is a block diagram showing a software structure in a processor unit of the current information apparatus in FIG. 1.
Figure 3:
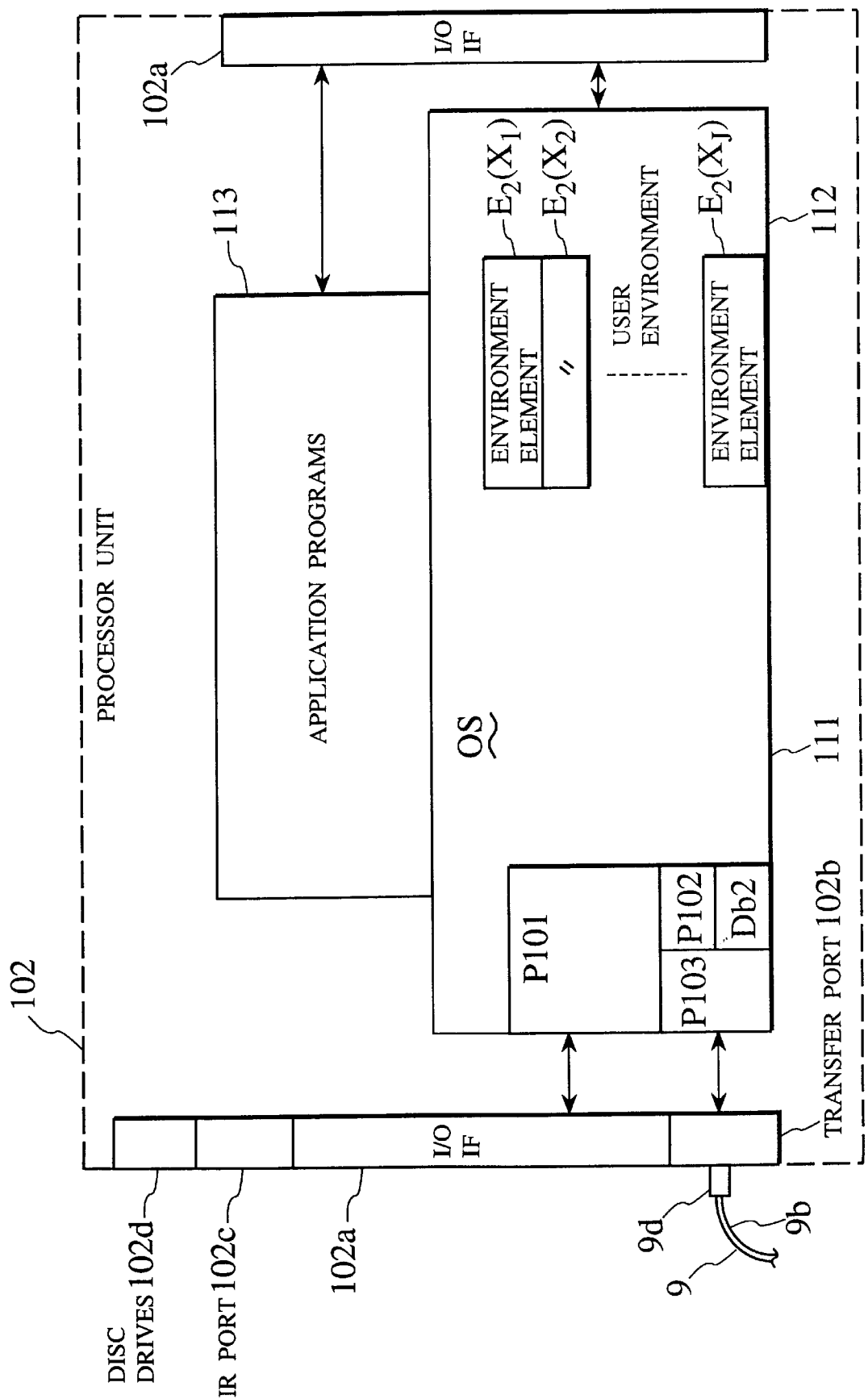
FIG. 3 is a block diagram showing a software structure in a processor unit of the new information apparatus in FIG. 1.
Figure 4:
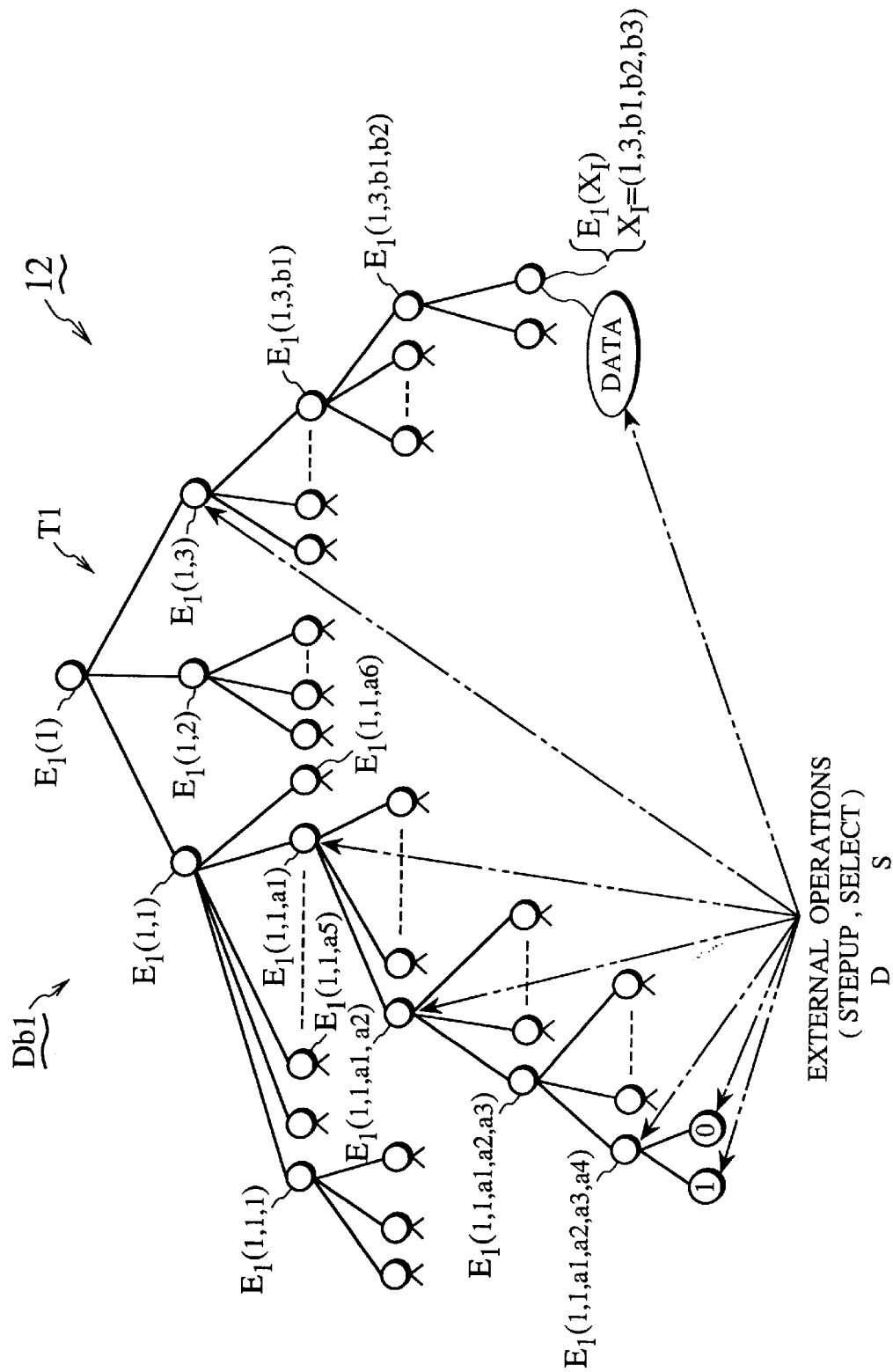
FIG. 4 is a diagram showing a hierarchical structure of a user environment information field of the current information apparatus shown in FIG. 2.
Figure 5:
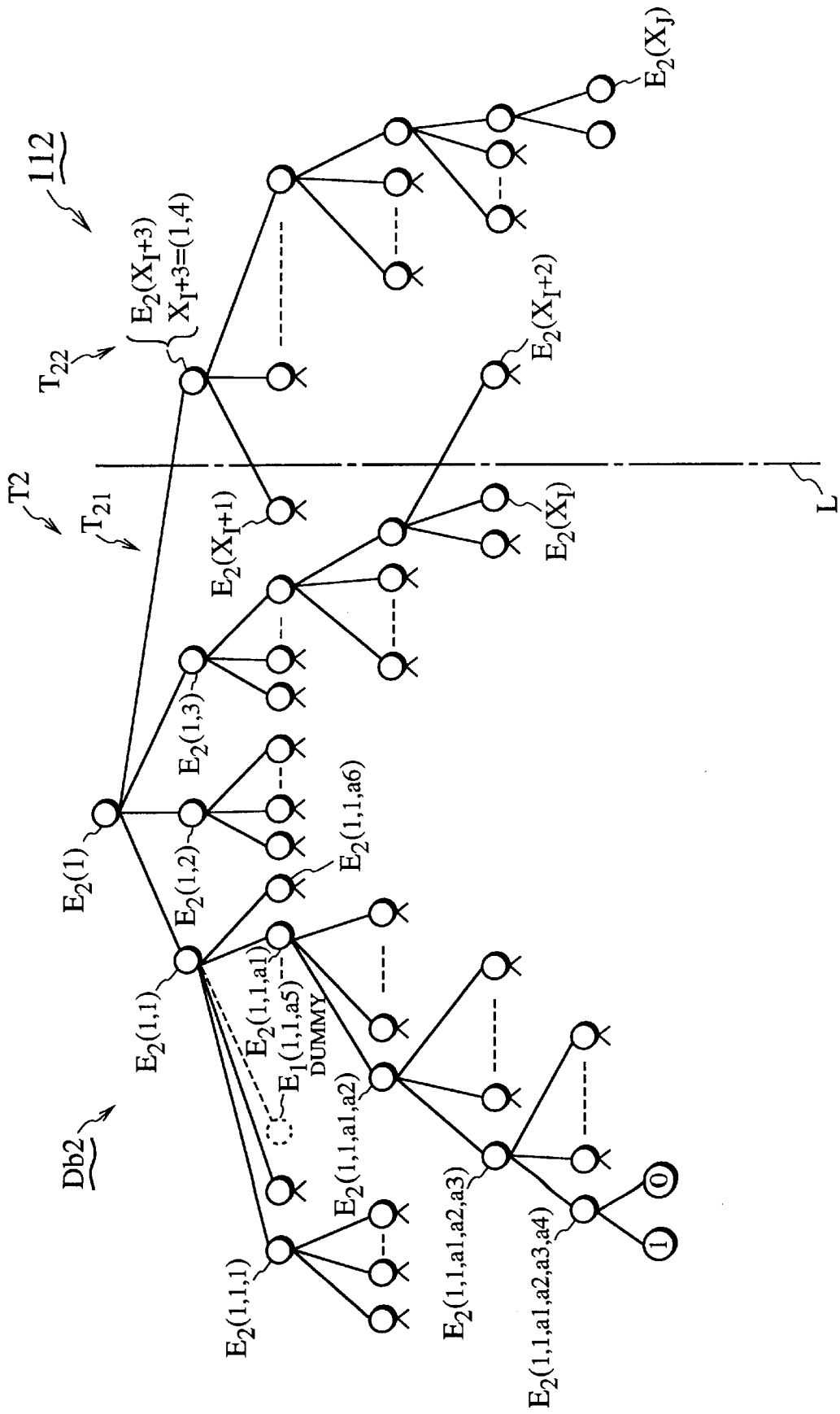
FIG. 5 is a diagram showing a hierarchical structure of a user environment information field of the new information apparatus shown in FIG. 3.
Figure 6:
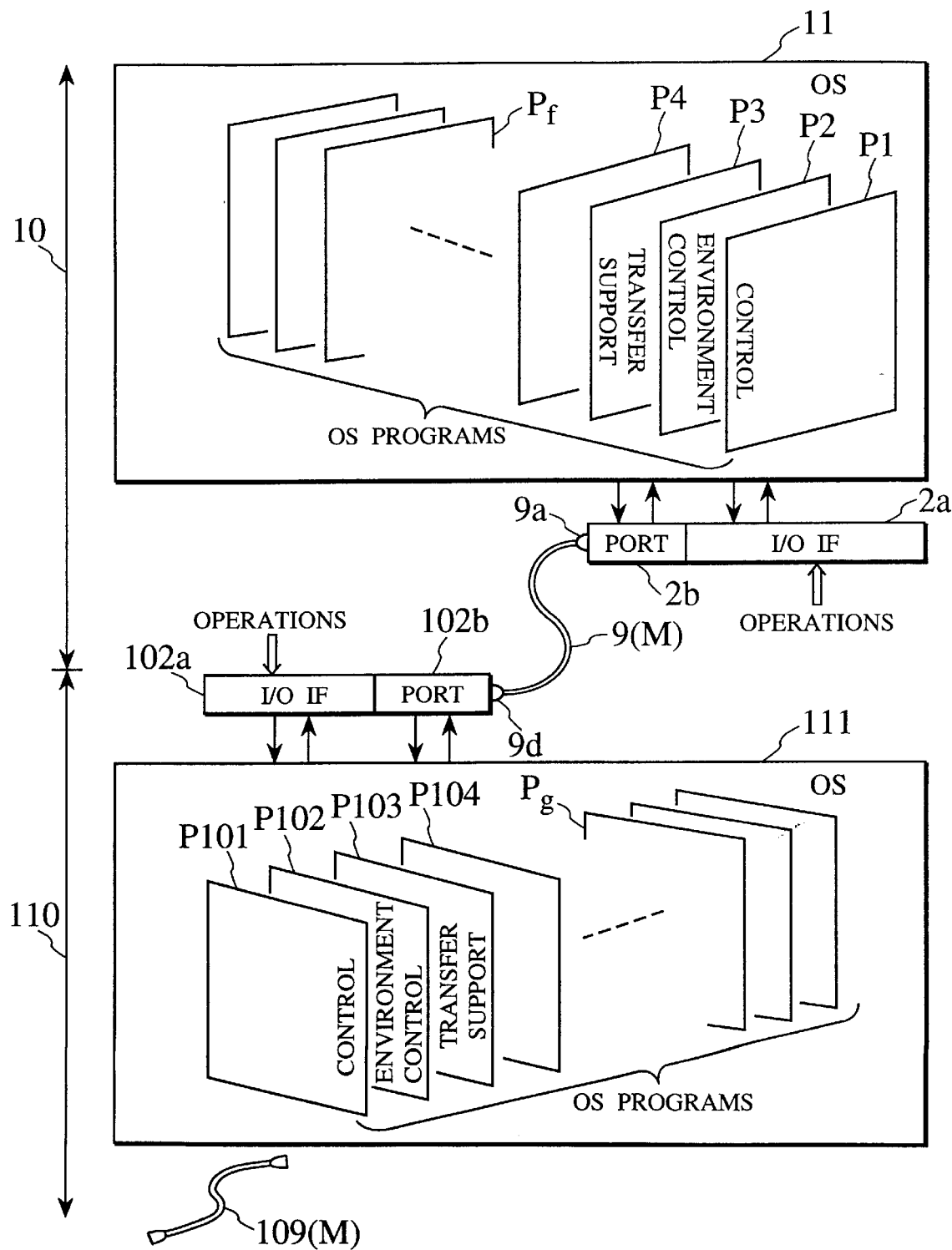
FIG. 6 is a block diagram showing a state in which the environment transfer systems of the current and new information apparatuses shown in FIG. 1 are connected.

FIG. 1 shows a state in which a user environment is transferred from a current information apparatus 1 including a user environment transfer system 10 of a current version according to a first embodiment of the present invention to a new information apparatus 101 including a user environment transfer system 110 of a subsequent version according to another embodiment. FIGS. 2 and 3 show processor units 2 and 102 of the current information apparatus 1 and the new information apparatus 101, respectively. FIGS. 4 and 5 show respective hierarchical structures of databases Db1 and Db2 as user environment information fields corresponding to user environments 12 and 122 of the current information apparatus 1 and the new information apparatus 101, respectively. FIG. 6 shows a state in which the user environment transfer systems 10 and 110 are connected.

The current information apparatus 1 is a so-called desk top type personal computer. As shown in FIG. 1, the current information apparatus 1 comprises a processor unit 2 in which an OS 11 is installed, a key board 4 which can be connected to an input/output interface (hereafter "I/O IF") 2a (FIG. 2) of the processor unit 2 by a cable 3, a pivotable CRT display 6 which can be placed on the processor unit 2 and which can be connected to the I/O IF 2a by a cable 5, a mouse 8 which can be connected to the I/O IF 2a by a cable 7, and a user environment transfer cable 9 provided at its one end 9a with a connector 9c which can be inserted in and removed from a transfer port 2b connected to the I/O IF 2a. An IR port 2c and disc drives 2d are also connected to the I/O IF 2a.

The processor unit 2 comprises an MPU, a ROM, a RAM and the like, which are not illustrated. As shown in FIG. 2, a user environment 12 supervised by the OS 11 is established in the processor unit 2, and application programs 13 operative on the OS 11 are loaded in the processor unit 2.

As shown in FIG. 4, the user environment 12 comprises a total of I environment elements E1 (Xn) (Xn is a symbol for identifying an environment element, and n is a suffix such that $1 \leq n \leq I$), and is made hierarchical to have the structure of a tree T1 using the environment elements E1(Xn) as nodes. The environment elements E1(Xn) are each displayable on the display, and can be each selected and set up by external operations.

For example, when Windows version "X" is used as the OS 11, element E1(1) corresponds to a "setup", and elements E1(1,1), E1(1,2) and E1(1,3) correspond to a "control panel", a "printer" and a "task bar", respectively. In this case, for example, letting "an" (n is a suffix) be a predetermined natural number, element E1(1,1,a1) corresponds to a "screen" icon, element E1(1,1,a1,a2) corresponds to a "background", element E1(1,1,a1,a2,a3) corresponds to a "pattern", and element E1(1,1,a1,a2,a3,a4) corresponds to a "carpet".

Each environment element E1(Xp) includes all of environment elements E1(Xq) belonging thereto (under a tree structure), and a group of associated arcs as select information S therefor. Each lowermost environment element E1(Xr) includes setup information D corresponding to '1' (select), '0' (non-select) or 'alfa-numeric data'.

The new information apparatus 101 is a so-called notebook type personal computer. As shown in FIG. 1, the new information apparatus 101 comprises an open-close type housing H, a processor unit 102 which is incorporated in a body H1 of the housing H and to which an OS 111 of a revised version is installed, a key board 104 incorporated in the body H1 and internally connected to an I/O IF 102a (FIG. 3) of the processor unit 102, a pointing device 108 incorporated in the body H1 and internally connected to the I/O IF 102a, a liquid crystal display 106 incorporated in an opening and closing portion H2 of the housing H and internally connected to the I/O IF 102a, and a user environment transfer cable 109 (FIG. 6) having a connection system common to the transfer cable 9 of the current information apparatus 1. A transfer port 102b, an IR port 102c and a disc drive 102d are also connected to the I/O IF 102b. The other end 9b (FIG. 3) of the user environment transfer cable 9 can be inserted in and removed from the transfer port 102b. It is also possible to connect a mouse to the processor unit 102, and to use the mouse instead of the pointing device 108.

The processor unit 102 also comprises an MPU, a ROM, a RAM and the like, which are not illustrated. As shown in FIG. 3, the processor unit 102 includes a revised user environment 112 supervised by the OS 111, and application programs 113 operative on the OS 111 are loaded in the processor unit 102.

As shown in FIG. 5, the user environment 112 comprises a total of J (J>I) environment elements E2(Xm)(Xm is a symbol for identifying an environment element, and m is a suffix such that $1 \leq m \leq J$), and is made hierarchical to have the structure of a tree T2 using the environment elements E2(Xm) as nodes. Also, the environment elements E2(Xm) are each displayable, and can be each selected and set up by external operations.

The tree T2 shown in FIG. 5 comprises a first tree portion T21 located at a left side with respect to an auxiliary line L, and a second tree portion T22 located at a right side with respect to the auxiliary line L. The first tree portion T21 comprises a group of environment elements E2(1)~ (dummy)~E2(XI), E2(XI+1) (,where E2(XI+1) corresponds to E1(1,1,a5),) one-to-one corresponding to all of environment elements E1(1)[E1(1,1,a5)~E1(XI) of the tree T1 of FIG. 4. The tree portion T21 is substantially equivalent to the tree T1 in "the definition information", whereas "the classification information" may be somewhat different. (For simplicity, I choose the example where the classification difference consists of a single element, i.e., E1(1,1,a5)). The second tree portion T22 comprises a group of newly added environment elements E2(XI+2), E2(XI+3)~E2(XJ).

The classification is thus modified from that of environment elements of the old user environment. In other words, (an environment element E2(XI+1) corresponding to) the environment element E1(1,1,a5) having belonged to E1(1,1) belongs to E2(XI+3) (XI+3=(1,4)) in the revised classification.

The new OS is designed so that such deviations can automatically be recognized at the side of the new information apparatus when the user environment information field is transferred. Details can be described as follows.

The current and new information apparatuses 1 and 101 respectively include the current version environment transfer system 10 and the subsequent version environment transfer system 110. The system 10 can securely transfer the user environment information field corresponding to the user environment 12 from the current information apparatus 1 to the subsequent information apparatus 101, and the system 110 can automatically input the transferred attribute information to the corresponding environment elements, if any.

As shown in FIG. 6, the current version user environment transfer system 10 comprises the OS 11, the I/O IF 2a, and transfer media M such as the user environment transfer cable 9, an IR beam, a DVD (digital video disk), etc. that can be utilized for the user environment transfer.

The subsequent version user environment transfer system 110 also comprises the revised version OS 111, the I/O IF 102a, and transfer media M such as the user environment transfer cable 109, etc.

The OS's 11 and 111 comprise groups of OS programs Pf and Pg which are appropriately combined and systematized. These program groups comprise:

1) OS control programs P1 and P101 for controlling entire operations of the OS's 11 and 111, respectively;
2) user environment control programs P2 and P102 each respectively adapted such as for:
   2-1) a function for creating a database Db1 in OS 11 (or Db2 in OS 111, vice versa) as a user environment information field comprising environment elements in a range of the user environment 12 (or 112) which is designed to be transferrable. The database Db1(or Db2) is the copy of the user environment 12 (or 112), and it has the structure of (attribute-valued) tree T1 (or T2) as shown in FIG. 4 (or in FIG. 5);
   2-2) a function for displaying the database Db1 (or Db2) on the display 6 (or 106);
   2-3) a function for allowing the user to voluntarily change attribute values of the database Db1 (or Db2) on the display 6 (or 106); and
   2-4) a function for updating the user environment 12 (or 112) in response to changed attribute values of the displayed database Db1 (or Db2); and
3) user environment transfer support programs P3, P103 each respectively adapted such as for:
   3-1) a function for reading database elements E1(Xni) (or E2(Xmj)) designated by the user in a range of the database Db1 (or Db2);
   3-2) a function for transferring the read database elements E1(Xni) (or E2(Xmj)) via the OS I/O IF 2a (or 102a) and any of the transfer media M to the opponent information apparatus 101 (or 1);
   3-3) a function for inputting information of contents of received database elements E1(Xni) (or E2(Xmj)), as it is (unless a classification difference is informed), to corresponding database elements E2(Xni) (or E1(Xmj)) of a database Db2 (or Db1) at the reception side so that these database elements are updated; and
   3-4) a function for responding to any received database element, e.g. E1(1,1,a5) (or E2(XI+1)), of which an exceptional difference in the tree structure is informed, to input information of its content to a corresponding database element, e.g. E2(XI+1) (or E1(1,1,a5)), so that this database element is updated.

The I/O IF 2a of the current information apparatus 1 interfaces input/output signals between the OS 11 including the user environment 12 and the application programs 13 and the display 6, the key board 4, the mouse 8, the transfer port 2b, the IR port 2c and the disc drives 2d.

The I/O IF 102a of the new information apparatus 101 interfaces input/output signals between the OS 111 including the user environment 112 and the application programs 113 and the display 106, the key board 104, the pointing device 108, the transfer port 102b, the IR port 102c and the disc drive 102d.

The transfer media M have their design specifications common between the current information apparatus 1 and the new information apparatus 101.

FIG. 7 shows an operational flow for the user environment transfer using the transfer cable 9.

First, at a step 201, the current and the new information apparatuses 1 and 101 are connected to each other by the cable 9.

Then, at a step 202, the current information apparatus 1 is started, an "environment transfer" icon is selected among setup items of a start menu, the icon is opened, and a "database" item is clicked. As a result, the current database Db1 is displayed on the display 6.

Similarly, at a step 203, the new information apparatus 101 is started, an "environment transfer" icon is selected among setup items of a start menu, the icon is opened, and a "database" item is clicked. As a result, the database Db2 is displayed on the display 106.

Then, at a step 204, from a database list on the display 6 of the current information apparatus 1, a combination of items which are desired to be transferred is AND-selected, and at a step 205, a "transfer" button (in the user environment transfer program of the current information apparatus 1) is clicked.

Then, at a step 206, a "receive" button (in the user environment transfer program of the new information apparatus 101) is clicked. As a result, the database Db2 is updated.

The DVD may be used as the transfer medium. In this case, I/O operations to the DVD are necessary.

In the case of infrared transfer, the step 201 is substantially omitted.

While preferred embodiments of the present invention have been described using specific terms, such description is for illustrative purposes, and it is to be understood that changes and variations may be made without departing from the spirit or scope of the following claims.

What is claimed is:

1. A user environment transfer system of an information apparatus, comprising:
    a user interface for inputting user information; and
    an operating system having a user environment comprising a set of hierarchical environment elements,
    wherein said operating system is configured to determine attribute values of one or more environment elements in accordance with the user information input through the user interface,
    said operating system is configured to transfer one of (i) the entire user environment and (ii) a part of the user environment with attribute values determined, collectively, to another information apparatus,
    said operating system is configured to create, besides a set of environment elements scattered in the operating system with attribute values determined, a user environment information field as a hierarchical unified object, component-wise corresponding to a set of environment elements and independently therefrom,
    said operating system is configured to create the user environment information field as a hierarchical database with a classification format having a tree structure corresponding thereto, and
    said operating system is configured to display the database on a display screen so that a part of the database can be designated as a logical AND operation through the user interface.

2. The user environment transfer system according to claim 1, wherein the operating system is configured to transfer the designated part of the database to said another information apparatus.

3. The user environment transfer system, according to claim 2, wherein a new operating system of a new information apparatus is configured to automatically update a corresponding part of a new user environment information field in accordance with the transferred part of the database.

4. The user environment transfer system according to claim 1, wherein, as said one of the entire and the part of the user environment is transferred, said operating system is configured to automatically update environment elements corresponding to environment elements of a transferred portion in the operating system in a new operating system of a new information apparatus at a transfer destination.

5. A user environment transfer method for an information apparatus, said method comprising:
    providing a user interface for inputting user information;
    providing an operating system having a user environment comprising a set of hierarchical environment elements,
    determining attribute values of one or more environment elements in accordance with the user information input through the user interface via said operating system;
    transferring one of (i) the entire user environment and (ii) a part of the user environment with attribute values determined, collectively, to another information apparatus via said operating system;
    creating, besides a set of environment elements scattered in the operating system with attribute values determined, a user environment information field as a hierarchical unified object, component-wise corresponding to a set of environment elements and independently therefrom via said operating system;
    creating the user environment information field as a hierarchical database with a classification format having a tree structure corresponding thereto via said operating system; and
    displaying the database on a display screen so that a part of the database can be designated as a logical AND operation through the user interface via said operating system.

6. The method of claim 5, further comprising:
    transferring the designated part of the database to said another information apparatus via said operating system.

7. The method of claim 6, further comprising:
    automatically updating a corresponding part of a new user environment information field in accordance with the transferred part of the database via a new operating system of a new information apparatus.

8. The method of claim 5, further comprising:
    automatically updating environment elements corresponding to environment elements of a transferred portion in the operating system in a new operating system of a new information apparatus at a transfer destination via said operating system, as said one of the entire and the part of the user environment is transferred.

9. A computer program product comprising a computer storage medium having a computer program embedded in said computer storage medium for causing a computer to transfer user environment of an information apparatus, said computer program performing the steps of:

providing a user interface for inputting user information;

providing an operating system having a user environment comprising a set of hierarchical environment elements, determining attribute values of one or more environment elements in accordance with the user information input through the user interface via said operating system;

transferring one of (i) the entire user environment and (ii) a part of the user environment with attribute values determined, collectively, to another information apparatus via said operating system;

creating, besides a set of environment elements scattered in the operating system with attribute values determined, a user environment information field as a hierarchical unified object, component-wise corresponding to a set of environment elements and independently therefrom via said operating system;

creating the user environment information field as a hierarchical database with a classification format having a tree structure corresponding thereto via said operating system; and displaying the database on a display screen so that a part of the database can be designated as a logical AND operation through the user interface via said operating system.

10. The computer program product of claim 9, wherein said computer program further performs the steps of:

transferring the designated part of the database to said another information apparatus via said operating system.

11. The computer program product of claim 10, wherein said computer program further performs the steps of:

automatically updating a corresponding part of a new user environment information field in accordance with the transferred part of the database via a new operating system of a new information apparatus.

12. The computer program product of claim 9, wherein said computer program further performs the steps of:

automatically updating environment elements corresponding to environment elements of a transferred portion in the operating system in a new operating system of a new information apparatus at a transfer destination via said operating system, as said one of the entire and the part of the user environment is transferred.

* * * * *